(12) United States Patent
Fricano (10) Patent No.: US 9,175,488 B2
(45) Date of Patent: Nov. 3, 2015

(54) THREE DIMENSIONALLY VARIABLE REEF FOR PROVIDING SPECIFIC WAVE CHARACTERISTICS

(76) Inventor: Phillip James Fricano, Scottsdale, AZ (US)

(*) Notice: Subject to any disclaimer, the term of this patent is extended or adjusted under 35 U.S.C. 154(b) by 0 days.

(21) Appl. No.: 12/804,482

(22) Filed: Jul. 22, 2010

(65) Prior Publication Data

US 2012/0020735 A1     Jan. 26, 2012

(51) Int. Cl.
| | | |
|---|---|---|
| *E02B 1/00* | (2006.01) | |
| *E04H 4/00* | (2006.01) | |
| *G09B 23/12* | (2006.01) | |
| *A47K 3/10* | (2006.01) | |

(52) U.S. Cl.
CPC ............. *E04H 4/0006* (2013.01); *A47K 3/10* (2013.01); *G09B 23/12* (2013.01)

(58) Field of Classification Search
CPC . E04H 4/0006; A63B 69/0093; A63B 69/125
USPC .......... 405/25, 79; 4/441; 472/59, 90, 91, 128
See application file for complete search history.

(56) References Cited

U.S. PATENT DOCUMENTS

| | | | | |
|---|---|---|---|---|
| 3,598,402 | A * | 8/1971 | Frenzl ............................. | 482/71 |
| 5,219,315 | A * | 6/1993 | Fuller et al. ..................... | 472/59 |
| 7,144,197 | B2 | 12/2006 | Black et al. | |
| 7,326,001 | B2 * | 2/2008 | McFarland ...................... | 405/79 |

* cited by examiner

*Primary Examiner* — Doug Hutton, Jr.
*Assistant Examiner* — Patrick Lambe
(74) *Attorney, Agent, or Firm* — Dorsey & Whitney LLP (57) ABSTRACT

An open chamber of predetermined size and shape is positioned within a pool bed so as to contain telescopic modules which occupy the chamber area. Each of the telescopic modules is independently extended and retracted in length by increase or decrease of the volume of water contained within a bellows, establishing in selected telescopic modules a specific reef size, shape, and orientation. When kinetic-energy within the water passes over the predetermined shape, size, and orientation of the reef, a wave is generated having specific features resulting from the properties of the specific reef configuration.

26 Claims, 10 Drawing Sheets

THREE DIMENSIONALLY VARIABLE REEF FOR PROVIDING SPECIFIC WAVE CHARACTERISTICS

FIELD OF THE INVENTION

The present invention relates to artificial water wave generation in natural and man-made bodies of water for surfing.

BACKGROUND OF THE INVENTION

Water waves occur in natural and artificial bathymetry. Wind, water current, and topographical ocean bed and pool floor features, each and in combination thereof can cause the generation of waves. Relying on naturally occurring conditions and limitations in geographic location can greatly diminish availability, predictability, frequency and quality of waves sought in the art and sport of board surfing. When the topography of an ocean bed or pool floor includes the presence of a reef, the kinetic energy of a wave passing over the reef can be greatly affected by the presence of the reef. The magnitude of the affect is dependent upon several factors, such as the depth of the water, slope at the approach to a beach, wave period, wave amplitude and direction of force in the kinetic energy of the wave with respect to the orientation of the reef. In simple terms, when the bottom-most depth of wave energy comes in contact with the incline approach to a beach, or to a much greater affect, the approach to a reef, the bottom-most depth of wave energy (trough) becomes increasingly retarded. The top-most height of the wave energy (crest) continues to advance at a constant rate. Eventually, gravity overcomes the unsupported wave crest, and the wave breaks and peels. Attempts have been made to enhance wave size, shape and direction of peel to best meet the demands of the surfer. Artificial reefs have been successfully constructed thereby enhancing the waves generated by wind, topographic features and bathymetry. Such reefs are constructed using mathematical, and scaled-down engineering models under conditions of several variables. Consequently, upon full-scale construction, the anticipated performance of the reef does not perform exactly as intended. Scale working models are utilized in testing reef size and configuration with promising results. However, when full-scale inventions are constructed at extensive cost, the performance is less than expected because of fluid dynamic inconsistencies in the physics of bringing models to full-scale size. The term applied to this phenomenon is "natural similitude". Most man-made reefs and all natural reefs are static and thereby exist in specific configuration resulting in drastically limited variation in wave generation. Rigid reef inventions that provide for variation in orientation and alignment with respect to a pool bed provide some variation in wave type, however they do not provide more than one direction of peel, they do not provide variation in the rate of peel of waves generated, they do not provide for wave life before decay, nor do they provide for a near infinite combination or plurality of simultaneous waves.

In other prior art wave forming devices, attempts have been made to enhance wave size, wave shape, wave duration, and wave direction of peel by placing an adjustable weir onto the bed of the body of water, normal to the direction of flow. The specific incline to the weir and decline to the bed is basically a reef. The elevation of the weir with respect to the elevation of the bed is varied by means of hydraulic piston cylinders, pivot points or combination of both. Other wave enhancing devices include rigid reef configurations that are suspended above the bed of the body of water at predetermined distances and predetermined angle of inclination with respect to the direction of water flow, thereby attempting to establish adjustment of the reef in juxtaposition to the bed, water flow, and water depth. Cables and or hydraulic pistons are interconnected, anchored onto the bed and onto the distal surface of the reef. In other prior art wave forming devices, a wave is actually simulated in the water itself, rather than being defined by a surface over which a thin sheet of water flows. U.S. Pat. No. 6,019,547 of Hill, Feb. 1, 2000 describes a wave forming apparatus which attempts to simulate natural antidune formations in order to create waves. A water-shaping airfoil disposed within a flume containing a flow of water, and a wave-forming ramp is positioned downstream of the airfoil structure. In other prior art arrangements, such as U.S. Pat. No. 6,928,670 B2, of Lochtefeld et al., Aug. 16, 2005 describes a moving reef wave generator that travels along the surface of a body of water, and preferably in the middle thereof, wherein the wave generator can create both primary and secondary wave that travel toward the shore. The primary waves are intended to allow surfing maneuvers to be performed in a relatively deep water environment. The secondary waves can break, wherein by modifying the shoreline's slope and curvature, and providing undulating peninsulas and cove areas, various multiple wave formations and effects can be created.

In the prior art of McFarland, U.S. Pat. No. 6,932,541 B2, Aug. 23, 2005, a plurality of a semi-rigid reef, referred to a a weir, is interconnected in cantilever onto the bed of a pool of water at the upstream, leading end having a predetermined abrupt incline and gentle downward slope at the downstream end. A secondary passageway extends through the bed form, with a first end adjacent the trailing end of the bed form, and a second end in the bed form upstream of the first end, thereby creating a pocket between the bed and underside of the Hydraulic rams independently control the lift of each cantilevered reef. A grating is provided between adjacent reefs to prevent inadvertent entry between the reefs and water return channels beneath. However, the grating provides the risk of collision with an occupant in the even of a fall in riding a wave. Furthermore, although the invention provides for some variation in wave size, it does not provide for variation in wave peel direction, wave type, wave size, or wave orientation. The flow of water current between wave cycles could create serious rip tides between and beneath the suspended reefs. In the prior art of Hill, U.S. Pat. No. 6,019,547, Feb. 1, 2000 an airfoil chute or pool and an aerofoil structure shapes the flow of water generated by the chute and variable ramp. Although there is some variation in wave shape of the surfable wave, the rigid surface of both airfoil and ramp limits the variation in reef configuration and thusly wave type, size, and peel. Furthermore, the suspended configuration of the airfoil presents a safety hazard, causing an occupant to become lodged between the airfoil and pool bed. In U.S. Pat. No. 6,928,670 B2, of Lochtefeld et al., Aug. 16, 2005, the moving reef traverses along the length of a pool near the surface of the water, pulled along a track fastened onto a pool bed. This moving device can be inadvertently impacted by the surfer resulting in serious injury. Even though the device moves, the rigid configuration greatly reduces the variation of wave generation types and direction of wave peel. To enhance wave size, the device must move at a greater rate of speed, thereby increasing the risk of bodily injury if impacted by the surfer. The mechanical means of connecting the moving reef device to the track system creates further risk of injury at the juncture of the moving reef's stem and tracking slot located between the track-mounted trolley and interconnecting moving reef. In testing a wave-generating invention at a scaled-down size, the outcome in full-scale engineering can result in failure. A full-scale production reef was constructed having a buoyant, rigid reef subtended by cables subtended from the distal face of the reef and anchored to a reinforced-concrete pool-bed. When tested, the wave energy generated an uplifting force sufficient enough to separate the attachment of the reef from the pool-bed, virtually pulling the anchored cables from the pool bed, causing millions of dollars in damage and severe delays in the project.

In the prior art of Fuller et al., U.S. Pat. No. 5,219,315, a simulator for water rides comprises a theater projection and sound that simulates motion for audience within a raft contained within the confines of a pool completely surrounded with walls. Adding to the simulation is a system for providing water spray, and actuators that provide a "rocking motion" to the raft when the actuators are operating. As such, relative to the earth, there is no actual displacement of the raft and the occupants referred to as the "audience" within the raft. The raft does not traverse any distance with respect to the raft's position to the earth . . . the raft merely experiences the "rocking" motion. In Fuller's invention, the actuators are either connected directly to the raft or the actuators are connected to a flexible plate which transmits agitation to the water contained within the pool which in turn, "rocks" the raft. Regardless of either configuration, in order for any rocking motion to be imposed to the raft, the actuators must be in motion since the actuators generate the "rocking" motion. When the embodiment utilizes the flexible plate to agitate the water, flexibility can only occur in one horizontal axis at a time because the plate cannot be stretched or compressed. This physical limitation of the plate limits the "rocking" motion to either side-to-side with respect to the raft, or front-to-back with respect to the raft. When the embodiment utilizes having the actuators connected directly to the raft, the rocking motion of the raft experiences can be more random with respect to side-to-side and/or front-to-back. However, in this particular embodiment whereby the actuators are connected directly to the raft, there is no need for water within the pool, further demonstrating the fact that the invention is merely a simulator, since the raft "rocks" without having the presence of water to both "rock" and support the raft in the stationary, "rocking" position.

It is therefore an object of the invention to provide a variety of wave size

It is another object of the invention to provide a variety in wave shape

It is another object of the invention to provide a predetermined wave direction of peel It is another object of the invention to establish a predetermined rate of wave peel It is another object of the invention to reconfigure wave attributes of size, shape, and orientation in minimum time It is another object of the invention to program predetermined reef configurations thereby program specific wave types It is another object of the invention to program predetermined reef configurations thereby program specific wave direction of peel It is another object of the invention to program predetermined reef configurations thereby program specific wave size It is another object of the invention to program predetermined reef configurations thereby program specific wave duration It is another object of the invention to program predetermined reef configurations to generate more than one wave simultaneously It is another object of the invention to provide a reef that will respond to human impact if inadvertently struck, thereby reducing risk of bodily harm or injury It is another object of the invention to provide a chamber that will allow for water circulation of the pool It is another object of the invention to provide a chamber that will minimize down-time in repair or replacement of a defective module

SUMMARY OF THE INVENTION

In accordance with the present invention, there is provided a reef that is comprised of a plurality of a telescopic-module that is grouped in a plurality of interconnected clusters thereby establishing contiguous three-dimensional variations for a reef. Each cluster is configured geometrically, comprised with a primary-module which is center-positioned and is interconnected with a surrounding plurality of a secondary-module. The primary-module acting as a hub, extends downwardly and beyond the distal end of the secondary-module thereby supporting the secondary-module. The geometric arrangement is much like pedals of a flower, whereby the secondary-telescopic-module represent the pedals and the primary-telescopic-module represents the pod, with a stem extending downwardly and beyond the distal end of the secondary-telescopic-module. The domain of the variable reef is established so as to provide the desired characteristics of specific waves desired. As a means of establishing the domain of the plurality of the telescopic-module within the confines of a pool floor, a chamber is provided. The chamber, communicating with a pool floor, is configured to a predetermined size, shape, and depth below the elevation of the pool floor, thereby acting as a yoke to restrict lateral movement of the plurality of the telescopic-module clusters when acted upon by kinetic-energy of water passing above the entire domain of the reef. The predetermined depth of the chamber dependent upon the predetermined maximum reef height required above the elevation of the communicating pool floor plane so as to achieve specific wave height characteristics. As such, the range of length of the telescopic-module extension from a full-retracted attitude coplanar with the pool floor to a full-extended attitude dictates the chamber depth beneath the pool floor. Furthermore, a minimal depth of the chamber is defined by the a predetermined distance below the distal end of the plurality of the secondary-module so as to permit technicians to traverse between the module clusters for the purpose of construction and maintenance of the reef system. This provision omits "down-time" in the event of repairs to the telescopic-modules. The domain of the telescopic-module provides for a variety of reef shape, size, and orientation within the confines of the chamber, thereby providing a means of generating a variety of wave shape, size, orientation, direction of peel, and duration of peel. Each of the telescopic-module is controlled independently so as to vary in extension independently. When completely retracted, the telescopic-module height is aligned within the same plane as the circumventing pool floor thereby establishing a condition as if no reef exists. When a plurality of predetermined telescopic-module is selected and activated to "telescope" or extend upwardly, each at a progressive predetermined height, the telescopic-module group acts in totality to create a unique, predetermined reef thereto creating a specific wave generation. Extension and retraction of each telescopic-module is accomplished, and controlled by a predetermined volume of water that is contained within a bellow interconnected within the confines of the telescopic-module. When the volume of water contained within the bellow is increased, the bellow elastically extends, thereby causing the telescoping-upper-body to elevate to a predetermined height above the plane of the encompassing pool bed. Conversely, when the volume of water contained within the bellow is depleted, the bellow elastically retracts, thereby causing the telescoping-upper-body to descend to a predetermined height above or at the plane of the encompassing pool bed. Once the desired attitude of each the telescopic-module is attained, no further displacement of motion of the telescopic-module takes place until a variation in wave performance is desired. As such, the telescopic-module motion, extension or retraction, does not create the wave energy. The wave energy is created upstream from the reef and the configuration of the reef causes the wave energy to generate specific variations in waves when the energy passes over the specific reef. These variations in reef shape, size, and orientation provide for creating various wave types, size, direction of peel, duration of peel, single and multiple simultaneous wave generation. In accordance with the direction of a kinetic-energy introduced to the water within the pool, a diagonal-left reef extends down-stream towards a beach traversing from right to left, thereby causing the kinetic-energy over-passing the diagonal-left-reef to generate a wave which will peel or break from right to left along a plateau permit technicians to traverse between said modules for the purpose of construction and maintenance of the reef system. This provision omits "down-time" in the event of repairs to the telescopic-modules. The domain of the telescopic-module provides a variety of reef shape, size, and orientation within the confines of the chamber, thereby providing a means of generating a variety of wave shape, size, orientation, direction of peel, and duration of peel. Each of the telescopic-module is controlled independently so as to vary in height independently. When completely contracted, the telescopic-module height is aligned within the same plane as the circumventing pool floor thereby establishing a condition as if no reef exists. When a plurality of predetermined telescopic-module is selected and activated to "telescope" or extend upwardly, each at a progressive predetermined height, the telescopic-module group acts in totality to create a unique, predetermined reef thereto creating a specific wave generation. In either scenario, the contiguous array of telescopic-modules to each other and to the confines of the chamber thereto communicating to the pool floor, prevents the possibility of a swimmer or surfer from inadvertently becoming trapped between the module clusters. Extension and retraction of each telescopic-module is accomplished, and controlled by a predetermined volume of water that is contained within a bellow interconnected within the confines of the telescopic-module. When the volume of water contained within the bellow is increased, the bellow elastically extends, thereby causing the telescoping-upper-body to elevate to a predetermined height above the plane of the encompassing pool bed. Conversely, when the volume of water contained within the bellow is depleted, the bellow elastically retracts, thereby causing the telescoping-upper-body to descend to a predetermined height above or at the plane of the encompassing pool bed. Once the desired attitude of each the telescopic-module is attained, no further displacement of motion of the telescopic-module takes place until a variation in wave performance is desired. As such, the telescopic-module motion, extension or retraction, does not create the wave energy. The wave energy is created upstream from the reef and the configuration of the reef causes the wave energy to generate specific variations in waves when the energy passes over the specific reef. These variations in reef shape, size, and orientation provide for creating various wave types, size, direction of peel, duration of peel, single and multiple simultaneous wave generation. In accordance with the direction of a kinetic-energy introduced to the water within the pool, a diagonal-left reef extends down-stream towards a beach traversing from right to left, thereby causing the kinetic-energy over-passing the diagonal-left-reef to generate a wave which will peel or break from right to left along a plateau of the diagonal-left-reef. Conversely, in accordance with the direction of the kinetic-energy introduced to the water within the pool bed, a diagonal-right-reef extends down-stream towards a beach traversing from the left to right, thereby causing the kinetic-energy over-passing the diagonal-right-reef-reef to generate the wave which will peel from left to right along the plateau of the diagonal-right-reef. When a reef is configured in a vee shape with the vertex located at or near the centerline of the pool and upstream, convex to the direction of the kinetic-energy, the wave generated peels from the vertex in both directions along the plateau of the vee-reef. The desired configuration, size, and orientation of any reef type is determined by means of testing at full-scale for the purpose of creating the optimum wave performance. Upon testing for each desired specific wave type, size, and orientation, the volume of water contained within each individual module is programmed into a computerized system. This full-scale testing and evaluation is therefore executed in a condition termed "natural similitude". As such, the programmed settings can be adjusted for subsequent testing of wave performance for the purpose of enhancing the wave characteristics desired. Furthermore, the domain of the reef and thusly the size and shape of the chamber is established with a predetermined size and shape omitting areas within the confines of the pool floor where the variable reef would prove ineffective. This measure of calculating the domain size and shape provides considerable economies of scale in cost savings. The cylindrical longitudinal shape of each set of three of the tangential adjoining telescopic-module provides a vertical equilateral concave triangular void. The void provides for circulation of water contained within the pool to pass downwardly through each of the void into the chamber and circulate from the chamber to a pumping filtration and purification system (not shown) located outside the confines of the pool, thereto returning filtered and purified water to the pool. Furthermore, the void provides for light to pass upwardly from a light source within the confines of the chamber to the pool area defined by the domain of the reef.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
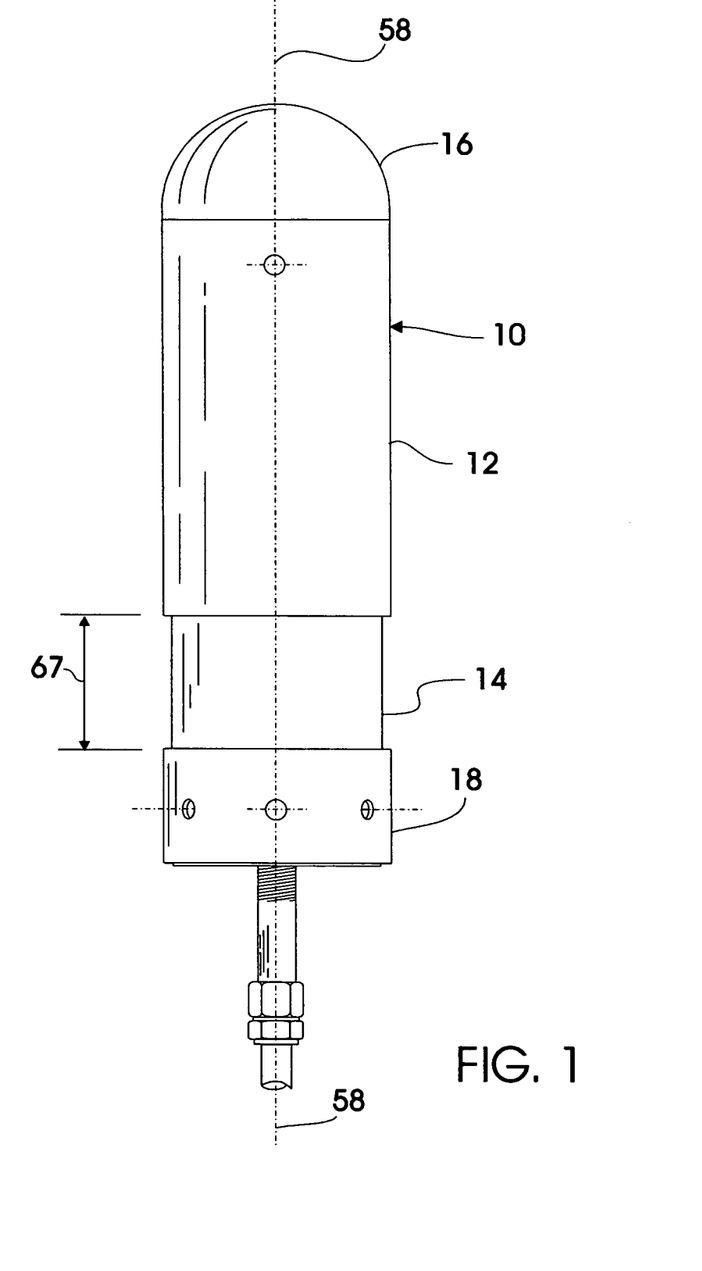
FIG. 1 is a side view of a telescopic-module partially extended as shown by a displacement of a telescoping-upper-body.

FIG. 1 is a side view of a telescopic-module 10 partially extended. As shown by a displacement 67 of a telescoping-upper-body 12, the telescopic-module 10 extension varies from a completely retracted-length 28 (show in FIG. 3) to a completely extended-length 30 (shown in FIG. 2). Along a centerline 58, the proximal end of the telescopic-module 10 is comprised of a hemispherical dome 16 made of an elastomeric material such as silicone so as to enhance compressibility if inadvertently impacted by a swimmer or surfer. Communicating with the dome 16 is the telescoping-upper-body 12. Longitudinally inserted within the telescoping-upper-body 12 is a stationary-lower-body 14 of predetermined outside diameter so as to provide slidability of the telescoping-upper-body 12 without causing lateral or concentric misalignment. The stationary-lower-body 14 is circumferentially fitted with a collar 18 of outside diameter equal to the outside diameter of the telescoping-upper-body 12. The collar 18 provides for proper parallel alignment when interconnected with one or more of the telescopic-module 10.

Figure 2:
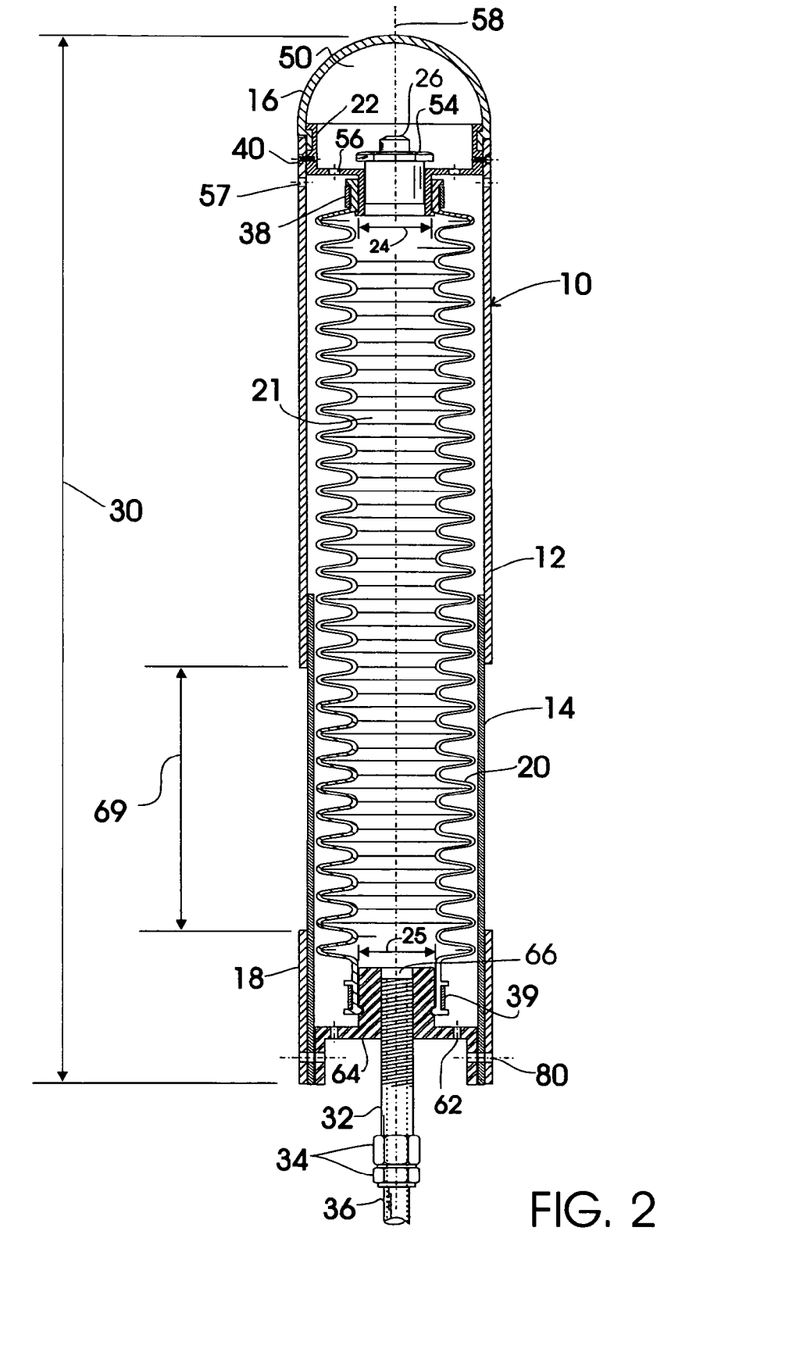
FIG. 2 is a longitudinal cross sectional view of a telescopic-module in a full extended length.

FIG. 2 is a longitudinal cross sectional view of the telescopic-module 10 in the full extended-length 30 showing a maximum-displacement 69. The dome 16 of the telescopic-module 10 is elastically captured onto a proximal-retainer 22. The proximal-retainer 22 is insertibly fitted into the proximal end of the telescoping-upper body 12 and is attached by means of a first-fastener 40. The proximal end of a bellow 20 is elastically fitted onto the proximal-retainer 22 and secured by means of a first-clamp 38. The proximal-retainer 22 also provides for attachment of a air-bleeder-valve 54 which is equipped with a air-bleeder-port 56 for the purpose of removing air trapped from within the confines of the invention. The distal end of the bellow 20 is elastically fitted onto a distal-retainer 64 and secured by means of a second-clamp 39. The distal-retainer 64 is insertibly fitted into the distal end of the stationary-lower-body 14. During the initial start-up of the invention or at time of repair, the telescopic-module 10 contains air trapped within the confines of a supply-tube 36, a inlet-pipe 32, a bellow 20, and a cavity 50 of the dome 16. The property of air being compressible, it must be removed from within the confines of the supply-tube 36, the inlet-pipe 32, the bellow 20, and the dome 16, and displaced by water. The volume of water to be contained within a hollow 21 of the bellow 20 varies depending upon the retraction or extension in length of the bellow 20. Air trapped within the supply-tube 36, the inlet-pipe 32, and bellow 20 is evacuated through a orifice 26 of the air-bleeder-valve 54 and is released into the cavity 50 of the dome 16. The air within the dome 16 is expelled into the confines of the telescoping-upper-body by means of a plurality of a first-air-bleeder-port 56 located through the horizontal surface of the proximal-retainer 22 within the confines of the dome 16. A second-bleeder-port 57 located at the proximal end of the telescoping-upper-body 12 and immediately below the location of the proximal-retainer 22 provides for the evacuation of air from the confines of the telescoping-upper-body, external to the invention. The cavity 50 of the dome 16 provides for collapse of the dome 16 upon inadvertent impact by a swimmer or surfer and memory of the elastic dome 16 will cause the dome 16 to return to a normal hemispherical shape. Once the volume of trapped air is expelled from within the inlet-pipe 32, supply-tube 36, and the bellow 20, the first-bleeder-port 56 serves a second purpose. In the event of inadvertent impact by a swimmer or surfer, the dome 16 will collapse, causing water contained within the dome 16 to evacuate through the first-bleeder-port 56 into the confines of the telescoping-upper-body 12. Subsequent to impact, the force of the memory of the elastic dome 16 causes the expelled water to return to the cavity 50 of the dome 16 through the first-bleeder-port 56. As a means of reducing the risk of sand or other such debris from collecting onto the horizontal surface of the distal-retainer 64, within the assembly of the telescoping-lower-body and said distal-retainer 64, a plurality of a weep-hole 62 is provided through said horizontal surface.

Figure 3:
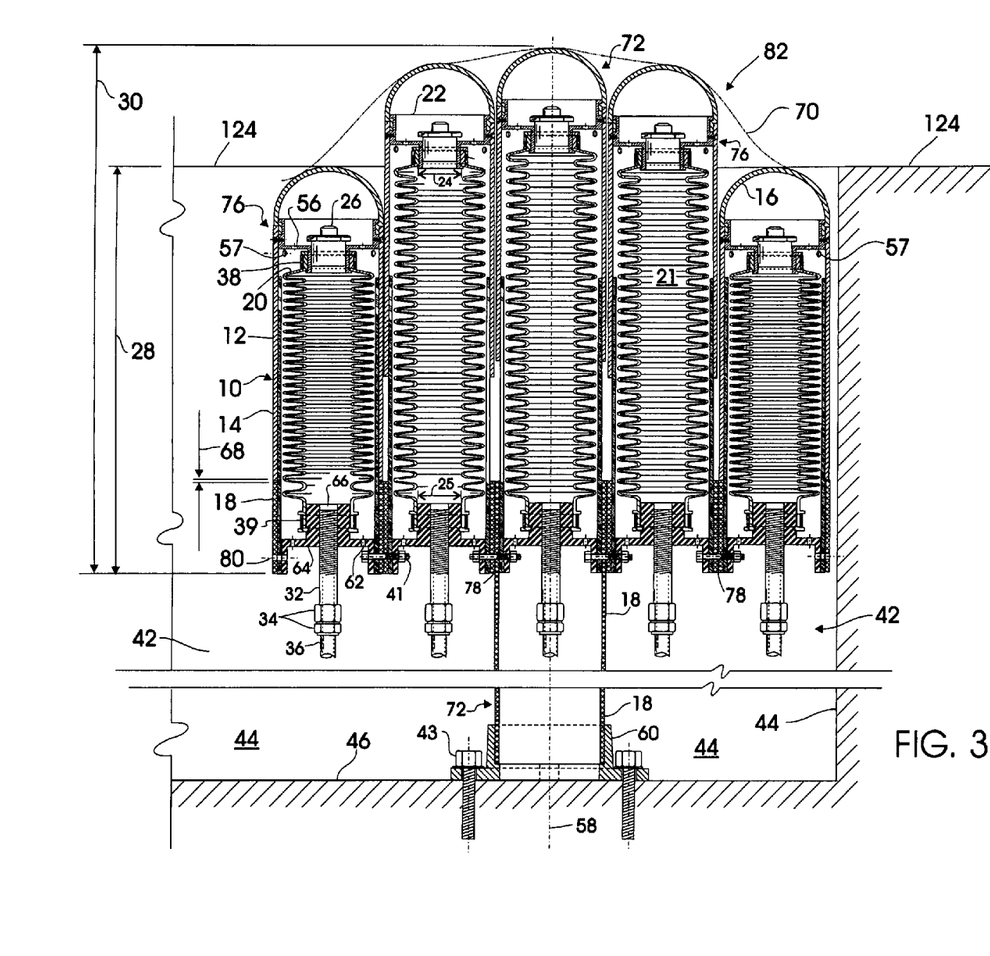
FIG. 3 is a longitudinal cross sectional view of a cluster of interconnected telescopic-modules at various extended lengths within the confines of a chamber and a base for anchoring a primary-module to a chamber-floor.

FIG. 3 is a longitudinal cross sectional view (taken from FIG. 4) of a cluster 82 of the telescopic-module 10 showing various lengths of extension ranging from a zero displacement 68 to a maximum-displacement 30. The cluster 82 is comprised of a primary-module 72 and a plurality of a secondary-module 76. Acting as a hub, the primary-module 72 is centered and surrounded geometrically by the plurality of the secondary-module 76. All of the telescopic-module 10 are interconnected with a plurality of a second-fastener 41 at a interface 78 through a bore 80. The second-fastener 41 is introduced through the bore 80 located so as to interconnect the distal-retainer 64, the stationary-lower-body 14, and the collar 18 of the adjoining telescopic-module 10. The adjoining plurality of the cluster 82 of the telescopic-module 10 create a building-block for a contiguous variable reef-domain 87 (shown in FIG. 8). The cluster 82 provides for establishing a means for having said cluster 82 pre-fabricated to enable the reef-domain 87 to be assembled with less effort and improved efficiency. The stationary-lower-body 14 of the primary-module 72 extends downwardly a substantial predetermined distance beyond the stationary-lower-body 14 of the plurality of the surrounding secondary-module 76 of the cluster 82 and communicates with a base 60 which in turn is anchored onto a chamber-floor 46 of a chamber 42 by means of a plurality of a third-fastener 43, thereby establishing and acting as a column to support the weight and maintain position of each of the cluster 82 to resist hydrodynamic forces generated by kinetic-energy 52 in a wave 114 (shown in FIG. 10) generation process. The configuration shows an independent predetermined extension of each of the telescopic-module 10 for the purpose of establishing a predetermined profile 70. When all in the plurality of the cluster 82 are interconnected, the contiguous variable reef is established. When all of the telescopic-module 10 are postured in the retracted-position 28 within the same plane as the pool bed 124, essentially there is no reef. When a predetermined selection of the telescopic-module 10 are extended or retracted to desired independent lengths, a specific shape, size, and oriented reef is established, thereto generating a conforming specific wave 114 (shown in FIG. 10) when the water is acted upon by a kinetic-energy 52.

Figure 4:
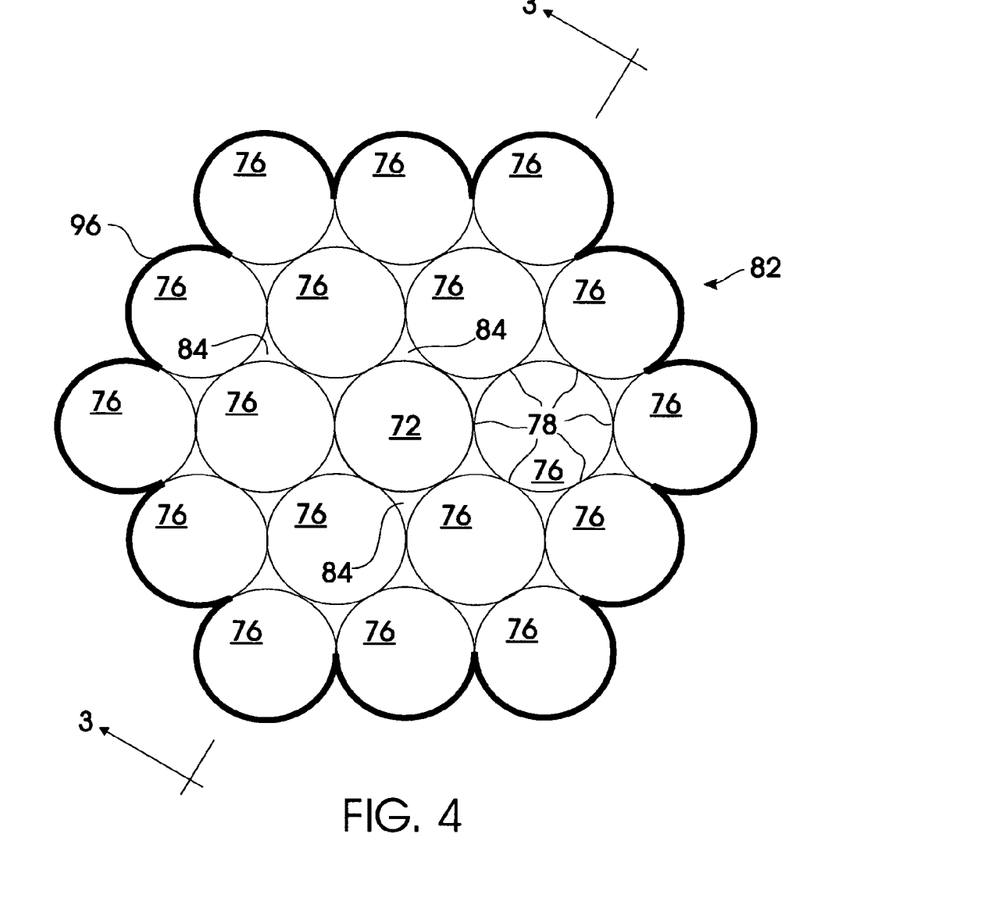
FIG. 4 is a top schematic view of a cluster of telescopic-modules showing the primary-module, and a plurality of secondary-modules.

FIG. 4 is a top schematic view of the cluster 82 of the telescopic-module 10 showing the primary-module 72, and a plurality of the secondary-module 76. A cluster-perimeter 96 defines the general hexagonal geometric shape generated by a plurality of the encompassing secondary-module 76. A series of two encompassing rows of the telescopic-module 10 are shown. However, the number of concentric rows can vary from a single encompassment to two or more, thereto increasing the number of the secondary-module 76 required from six to eighteen respectively, and so forth. Each of the tangential adjoining telescopic-module 10 establish the interface 78. The area between each of the three adjoining telescopic-module 10 create a equilateral triangular concave void 84. The void 84 provides a conduit for water circulation from a pool 123 (shown in FIG. 10) into the chamber 42. Water is pumped from the chamber 42 to a purification and filtration system (not shown) outside the confines of the pool 123, and is thereto circulated back to the pool 123. Another purpose of the void 84 is to illuminate the water above the area of the reef from within the confines of the chamber 42 by providing lighting fixtures at predetermined locations at the chamber-floor 46, directing light upwardly through the void 84 thereby creating a visual enhancement after dark. The illumination will also provide light necessary for repairs to the telescopic-module 10 from within the chamber 42.

Figure 5:
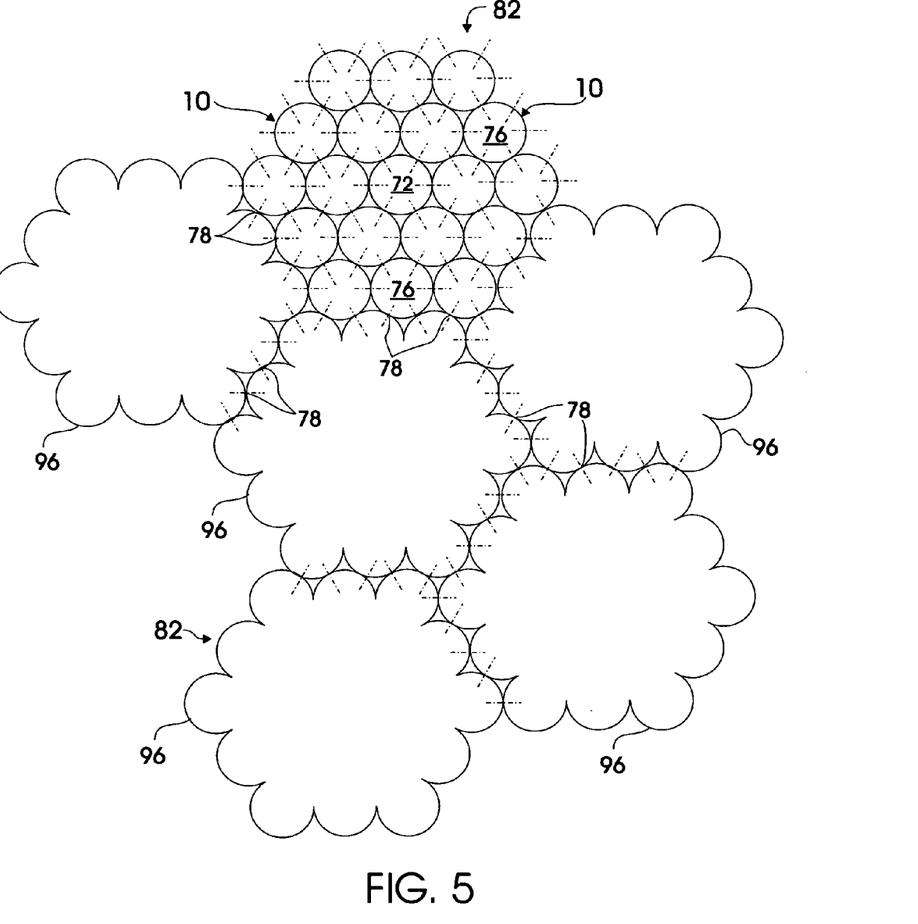
FIG. 5 is a top schematic view of a cluster of telescopic-modules, and a cluster-perimeter of a plurality of the clusters interconnected.

FIG. 5 is a top schematic view of the cluster 82 of the telescopic-module 10, and the cluster-perimeter 96 of the plurality of the cluster 82 interconnected. The interface 78 is the location for interconnection of each of the telescopic-module 10, and the adjoining cluster 82 by means of a plurality of the second-fastener 41. Juxtaposition of each of three of the tangentially adjoining telescopic-module 10 creates the void 84 which provides for water circulation from the pool 123 communicating with the chamber 42, and pool illumination above the reef-domain 87.

Figure 6A:
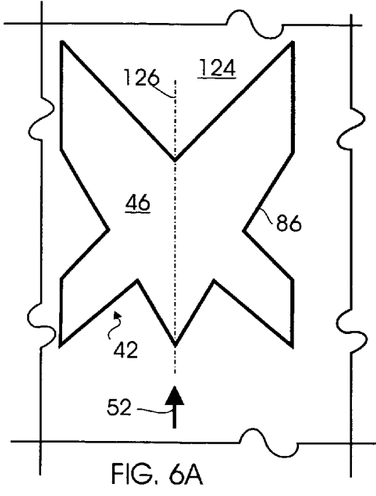
FIG. 6A is a plan view of the chamber of predetermined shape, size, and location within the confines of a pool floor.

FIG. 6A is a plan view of the chamber 42 of predetermined shape, size, and location as defined by the chamber-floor 46, within the confines of the pool floor 124. The geometric configuration of the chamber 42, as defined by the chamber-perimeter 86, in lieu of a simple rectilinear perimeter, greatly reduces the number of the telescopic-module 10 by omission of areas where the reef is not required, thereto providing a cost saving. The chamber 42 is comprised of a longitudinal axis-of-symmetry 126 parallel to a kinetic-energy 52 direction for providing a reciprocal of any configuration. FIG. 6A is oriented for clarity so as to provide interpretation of the reader of the invention as being the surfer moving in the direction of the kinetic-energy 52.

Figure 6B:
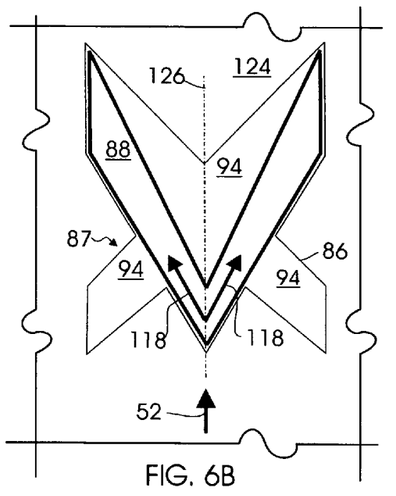
FIG. 6B is a plan view of a chamber showing a predetermined vee-reef, a peel direction, and a kinetic-energy-direction.

FIG. 6B is a plan view of the chamber 42 showing within outline a predetermined vee-reef 88 for generating a wave 114 (shown in FIG. 10), having a peel 118 (shown in FIG. 10) direction of the breaking wave 114, and the kinetic-energy 52 direction. The vee-reef 88 generates the wave 114 with the peel 118 beginning at the axis-of-symmetry 126 and moving outwardly, and equidistantly in both directions as shown. The telescopic-module 10 located in the area established between the chamber-perimeter 86, and the vee-reef 88 are dormant, and remain in the full retracted-position 28. FIG. 6B is oriented for clarity so as to provide interpretation of the reader of the invention as being the surfer moving in the direction of the kinetic-energy 52. Chamber 42 defines the reef-domain 87. The shape of the vee-reef 88 is not necessarily limited to be confined within the outline of FIG. 6B as this outline merely provides for a general configuration of the vee-reef 88, and the wave 114 generation option.

Figure 6C:
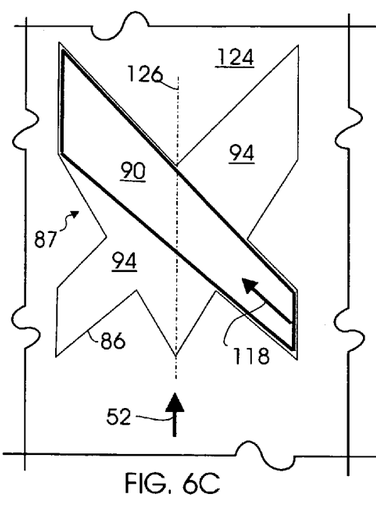
FIG. 6C is a plan view of a chamber showing a predetermined diagonal-left-reef, a peel direction, and a kinetic-energy direction.

FIG. 6C is a plan view of the chamber 42 showing within outline a predetermined diagonal-left-reef 90 for generating the wave 114 (shown in FIG. 10) having the peel 118 direction of the breaking wave 114, and the kinetic-energy 52 direction. The diagonal-left-reef 90 generates the wave 114 with the peel 118 beginning at the right showing the direction of the peel 118. Chamber 42 defines the reef-domain 87. FIG. 6C is oriented for clarity so as to provide interpretation of the reader of the invention as being the surfer moving in the direction of the kinetic-energy 52. The shape of the diagonal-left-reef 90 is not necessarily limited to be confined within the outline of FIG. 6C as this outline merely provides for a general configuration of the diagonal-left-reef 90, and the wave 114 generation option.

Figure 6D:
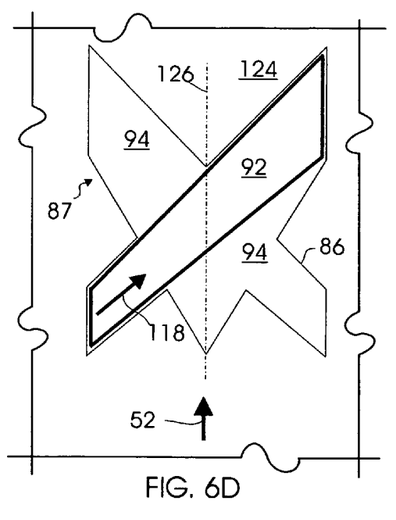
FIG. 6D is a plan view of the chamber showing a predetermined diagonal-right-reef, a peel direction, and a kinetic-energy direction.

FIG. 6D is a plan view of the chamber 42 showing within outline a specific diagonal-right-reef 92 for generating the wave 114 (shown in FIG. 10) having the peel 118 direction of the breaking wave 114, and the kinetic-energy 52 direction. The diagonal-right-reef 92 generates the wave 114 with the peel 118 beginning at the left showing the direction of the peel 118. Chamber 42 defines the reef-domain 87. FIG. 6D is oriented for clarity so as to provide interpretation of the reader of the invention as being the surfer moving in the direction of the kinetic-energy 52. The shape of the diagonal-right-reef 92 is not necessarily limited to be confined within the outline of FIG. 6D as this outline merely provides for a general configuration of the diagonal-right-reef 92, and the wave 114 generation option.

Figure 7:
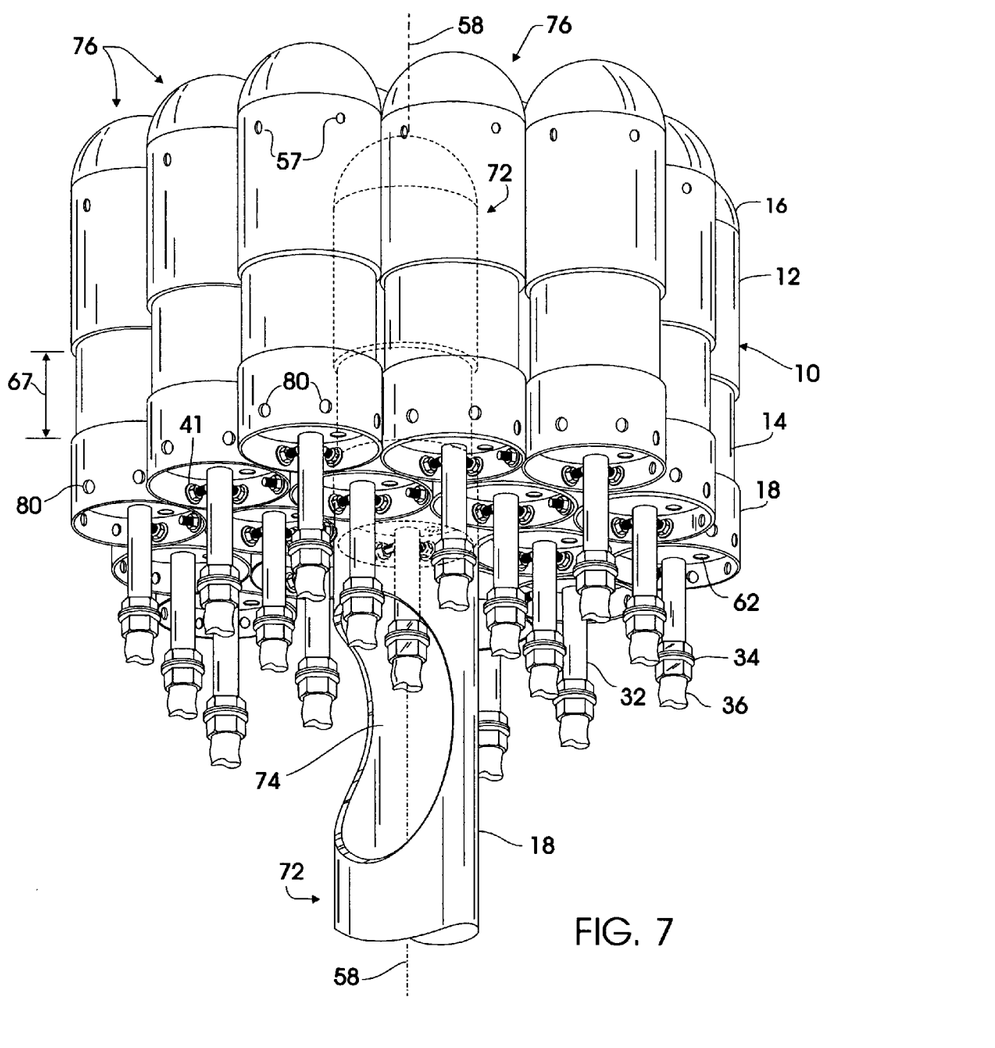
FIG. 7 is a perspective view of a cluster of a telescopic-module showing a primary-module, and a plurality of a secondary-module.

FIG. 7 is a perspective view of the cluster 82 of the telescopic-module 10 showing the primary-module 72, and a plurality of the secondary-module 76. The collar 18 of the primary-module 72 extends downwardly communicating with the base 60 thereto communicating with the chamber-floor 46 of the chamber 42. The base 60 is anchored onto the floor 46 by means of a plurality of the third-fastener 43, thereby preventing uplifting dynamic force caused by the wave 114 (shown in FIG. 10) generation across, and above the reef-domain 87 (shown in FIG. 8). A access-opening 74 within the collar 18 of the primary-module 72 is provided in proximity to and below the distal-retainer 64 for the purpose of assembly, and attachment of the distal end of the bellow 20, the distal-retainer 64, the inlet-pipe 32, the union 34, and transmission of the supply-tube 36. Each of the telescopic-module 10 is operated independently for establishing variation in extension of the telescopic-module 10 thereto establishing variation in reef size, shape, and orientation.

Figure 8:
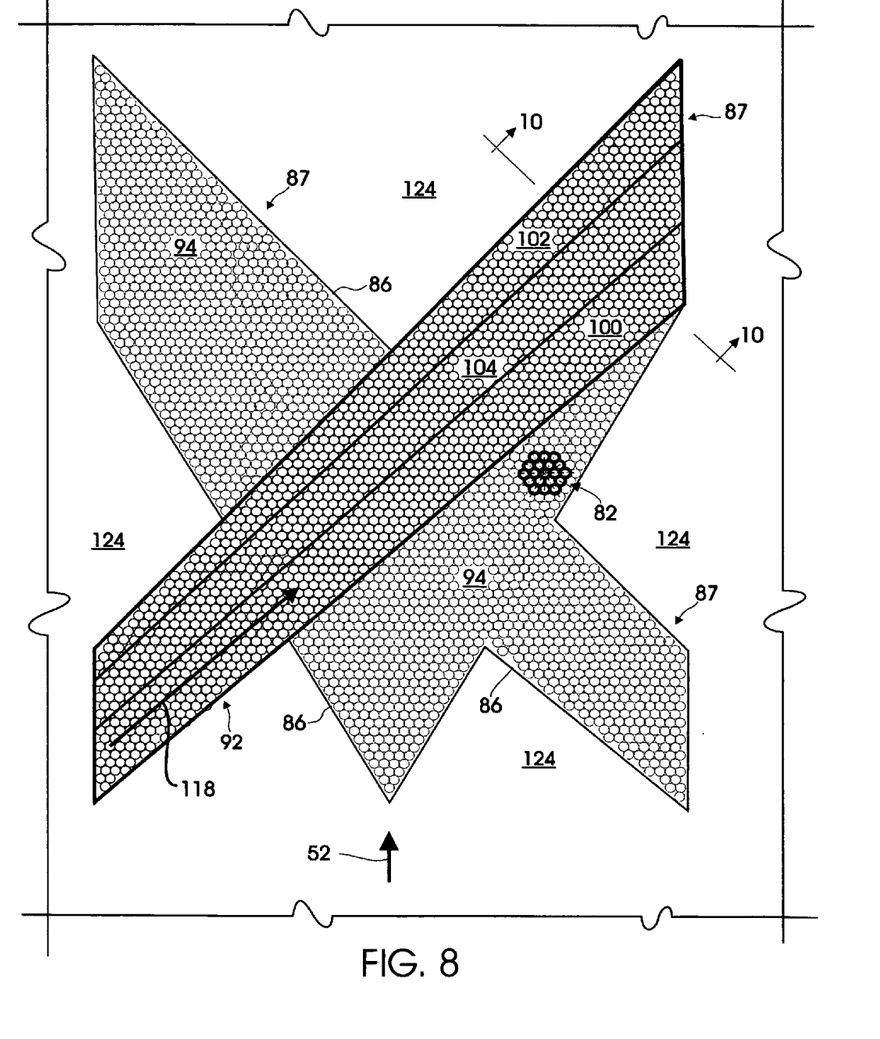
FIG. 8 is a plan view of a reef-domain within the confines of a pool floor showing a diagonal-right-reef and a dormant-reef.

FIG. 8 is a plan view of the reef-domain 87 within the confines of the chamber 42 showing to full capacity, the total population of the telescopic-module 10 establishing the domain within the chamber-perimeter 86. The diagonal-right-reef 92 is comprised of a series of three distinct planes comprising a proximal-slope 100, a plateau 104, and a distal-slope 102, given in the respective sequence to the kinetic-energy 52 direction. The direction of the peel 118 is shown to begin at the left of the diagonal-right-reef 92 as the kinetic-energy advances toward a beach (not shown). One of the cluster 82 positioned within the dormant-reef 94 field is defined independently for clarity. FIG. 8 is oriented for clarity so as to provide interpretation of the reader of the invention as being the surfer moving in the direction of the kinetic-energy 52. The shape of the diagonal-right-reef 92 is not necessarily limited to be confined within the outline of the diagonal-right-reef 92, as this outline merely provides for a general configuration of the reef, and the wave 114 generation option.

Figure 9:
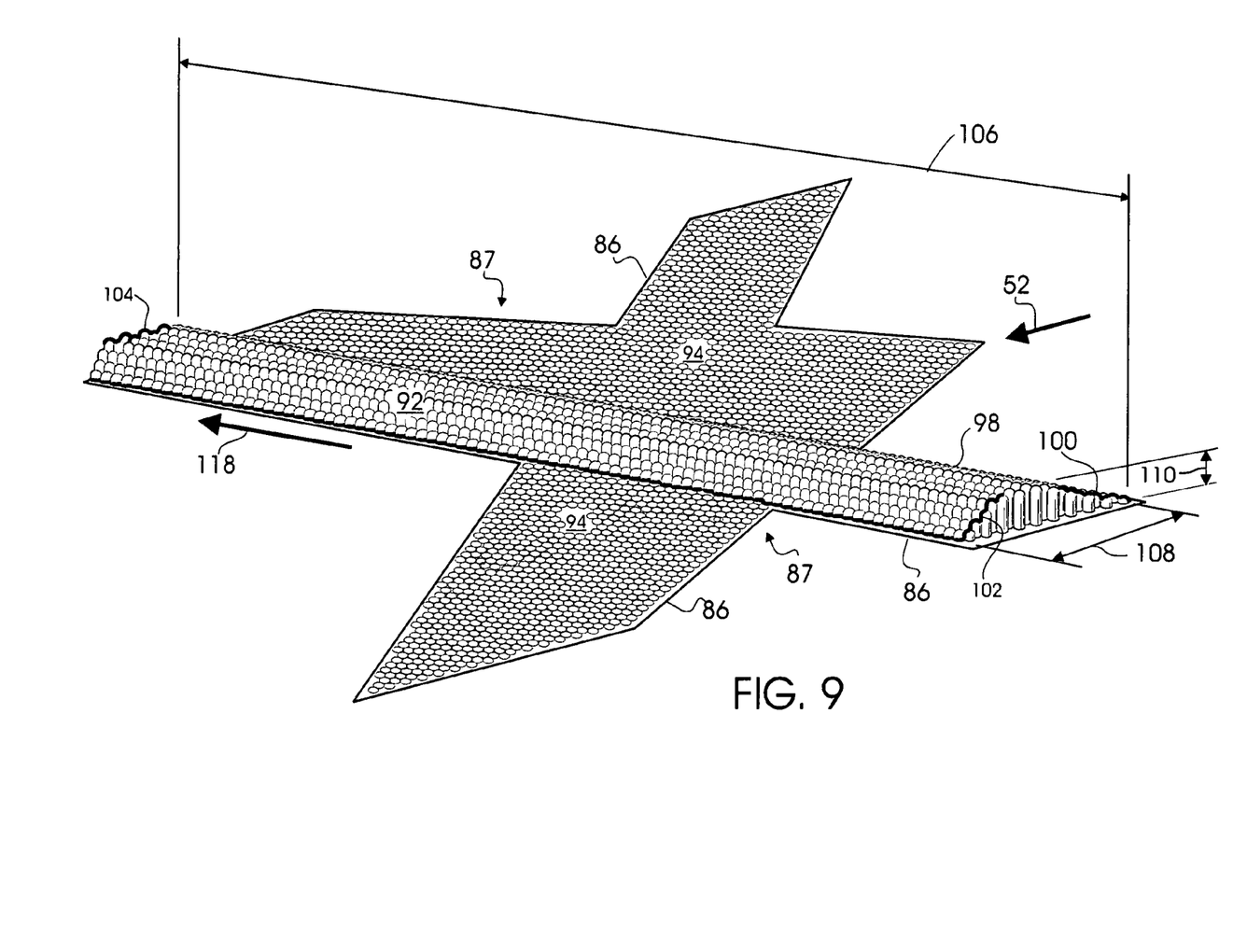
FIG. 9 is a perspective view of a reef-domain showing a predetermined diagonal-right-reef, a peel direction, a kinetic-energy direction; and a dormant-reef.

FIG. 9 is a perspective view of the reef-domain 87 within the confines of the chamber 42 showing the predetermined diagonal-right-reef 92, the peel 118 direction, and the kinetic-energy 52 direction. A length 106 of the diagonal-right-reef 92 is shown corresponding to a width 108 of the diagonal-right-reef 92. A height 110 of the diagonal-right-reef 92 represents the elevation of the plateau 104 with respect to the pool-floor 124 (shown in FIG. 10). The dormant-reef 94 is shown outside the delineation of the diagonal-right-reef 92 which represents the plurality of the telescopic-module 10 which remain coplanar to the pool-floor 124. As kinetic-energy 52 passes in the general direction as shown, the kinetic-energy 52 is confined by approach to a toe 98 along the length 106 of the proximal-slope 100, and continues to be further confined along the proximal-slope 100 to the plateau 104, causing the wave 114 to break, and create the peel 118 before passing beyond the distal-slope 102 (shown in FIG. 10). Reef size, orientation, or configuration can be modified or changed from the diagonal-right-reef 92, the diagonal-left-reef 90, the vee-reef 88, or any combination or plurality thereof simply by increasing or decreasing the volume of water contained within the bellow 20 of each of the independently controlled telescopic-module 10.

Figure 10:
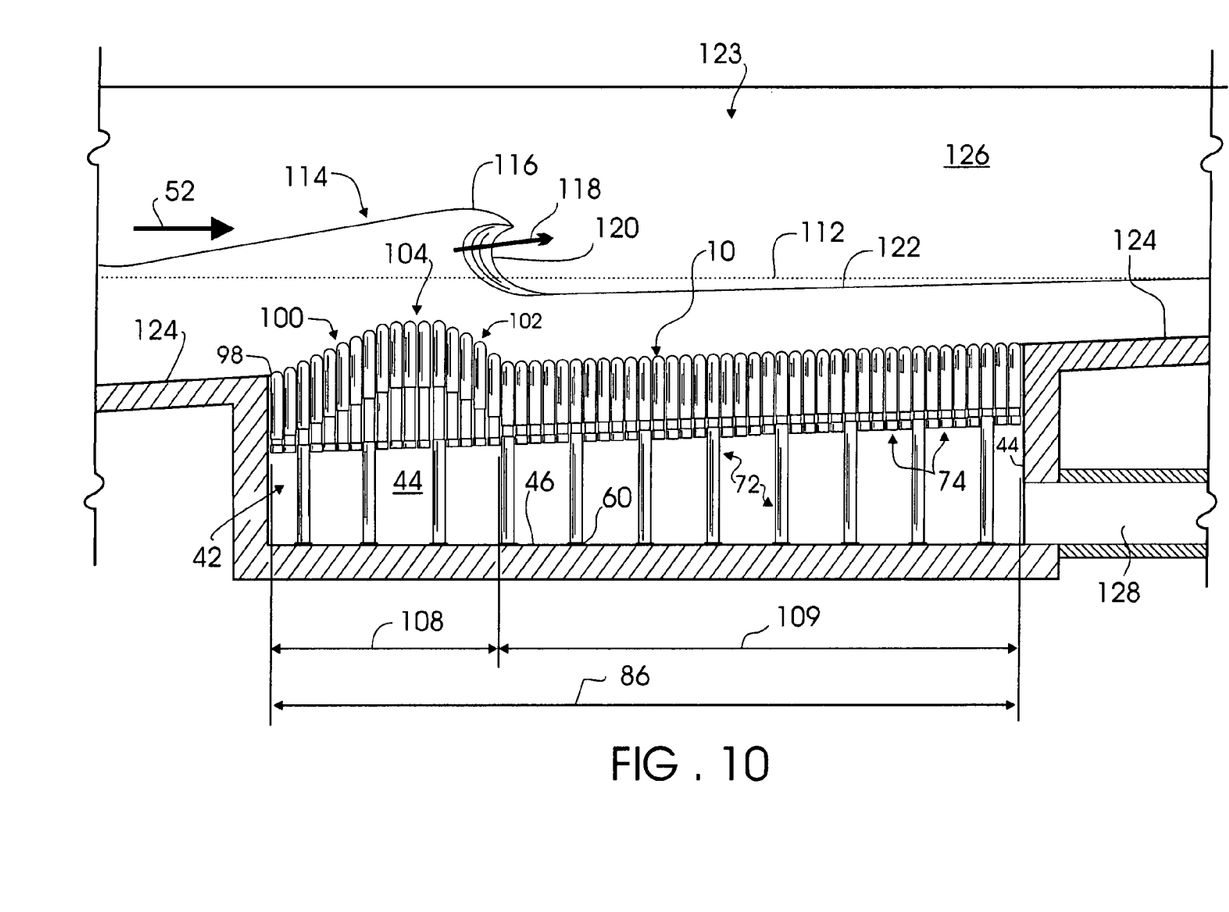
FIG. 10 is a cross sectional view of a chamber within the confines of a pool floor showing a diagonal-right-reef, a dormant-reef, and a wave generation.

FIG. 10 is a cross sectional view (taken from FIG. 8) of the chamber 42 within the confines of the pool floor 124. The chamber 42 is comprised of the chamber-wall 44 thereto communicating with the chamber-floor 46 of the chamber 42 for establishing the chamber-perimeter 86. Furthermore, communicating with the chamber-wall 44 of the chamber 42 is a raceway 128, thereto communicating with a water volume control station (not shown) located outside the confines of the pool 123. The plurality of the supply-tube 36 is extended from each of the telescopic-module 10 to the water volume control station (not shown) beyond the confines of the chamber 42 through the raceway 128. The raceway 128 also provides for chamber 42 access during construction, and maintenance of the plurality of the telescopic-module 10. The water volume supplied or withdrawn to or from each of the telescopic-module 10 is controlled independently by means of a computerized valve system, causing the bellow 20 to extend or retract respectively, thereto causing the telescopic-module 10 to extend or retract respectively. The totality of telescopic-module 10 within the confines of the chamber 42 are programmed to either remain in part with a predetermined dormant-reef 94, or are programmed to establish the predetermined size, and shape of a specific reef, or plurality of reefs. The basic reef configurations are shown in FIG. 6B, FIG. 6C, FIG. 6D. The predetermined width 108 of the diagonal-right-reef 92 is shown communicating with the dormant-reef-width 109 of the dormant-reef 94. The elevation, and horizontal plane of a static-water-line 112 is disrupted by the wave 114 kinetic-energy 54, thereby creating a dynamic-water-line 122. As the kinetic-energy 52 within the water approaches the toe 98 of the diagonal-right-reef, the kinetic-energy 52 becomes increasingly retarded relative to the energy at the water's surface to a specific depth (which is dependent upon several factors). This "dragging" effect increases until the kinetic-energy 52 reaches the plateau 104 and a crest 116 advances beyond the relative position of the kinetic-energy toward the depth of the water, creating a face 120 of the wave 114. Overcome by gravity, the mass of the water above the static-water-line 122 at the crest 116 and the wave 114 begins to collapse and create the peel 118 in a direction influenced by the advancing direction of the diagonal-right-reef towards a beach (not shown). Hence, the peel 118 direction is to the right, thereto providing a "barrel" or riding surface for the surfer as the wave 114 continues to generate the peel 118 and finally decay toward the beach (not shown).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A variable artificial reef system comprising:
a pool bed;
a plurality of telescoping modules controlled to remain generally coplanar with the pool bed or to establish a predetermined profile of an artificial reef structure having a toe extending in the pool bed, the artificial reef structure defining a series of at least three distinct surface regions, each comprising a proximal slope, a plateau, and a distal slope given in respective sequence to a kinetic energy direction; and
the artificial reef structure configured to generate specific artificial water waves of various configuration including crest, face and peel having peel direction and rate of peel, wherein kinetic energy in each generated artificial water wave approaches the toe along a length of the proximal slope to the plateau of the artificial reef structure, the generated artificial water waves breaking along the plateau to create the peel passing beyond the distal slope of the artificial reef structure;
wherein each telescoping module comprises:
a telescoping upper body member;
a dome positioned on the telescoping upper body member;
a stationary lower body; and
a bellows positioned within the telescoping upper body member and the lower body member;
wherein a selection of the telescoping modules is configured by extension at stationary, progressive predetermined heights in the predetermined profile to establish a specific size, shape and orientation of the artificial reef structure in the pool bed, wherein each of the proximal slope, plateau, and distal slope are comprised of a matrix of a plurality of adjacent telescoping modules extended at the stationary, progressive predetermined heights to generate the artificial water waves when acted upon by the kinetic energy, and wherein the artificial water waves continue to generate the peel in passing beyond the plateau and along the distal slope of the artificial reef structure; and
wherein the plurality of telescoping modules are configurable to be positioned in a plurality of variable, overlapping subsets extended or retracted to define the at least three distinct surface regions.

2. The variable artificial reef system of claim 1, wherein each telescoping module further comprises a collar formed around an outer perimeter of the stationary lower body member.

3. The variable artificial reef system of claim 2, wherein each telescoping module further comprises a plurality of bores formed through the collar for securing to an adjacent plurality of adjoining telescoping modules.

4. The variable artificial reef system of claim 1, wherein each telescoping module further comprises a distal retainer coupled to the bellows and to the stationary lower body member.

5. The variable artificial reef system of claim 4, wherein each telescoping module further comprises a plurality of weep holes formed in the distal retainer device for removing debris.

6. The variable artificial reef system of claim 4, wherein each telescoping module further comprises an opening formed in the distal retainer for securing the inlet conduit.

7. The variable artificial reef system of claim 1, wherein each telescoping module further comprises a proximal retainer coupled to the bellows and to the telescoping upper body.

8. The variable artificial reef system of claim 7, wherein each telescoping module further comprises an air bleeder valve coupled to the proximal retainer.

9. The variable artificial reef system of claim 1, wherein the plurality of telescoping modules comprises a plurality of clusters, each cluster comprising a primary telescoping module which further comprises an anchor base coupled to the lower body member of the primary telescoping module to secure the cluster of telescoping modules to a floor of a chamber within the confines of the pool bed, and further comprising a plurality of secondary telescoping modules surrounding the primary module.

10. The variable artificial reef system of claim 1, wherein the plurality of telescoping modules are arranged in sets of tangentially adjoining telescoping modules comprising a primary module surrounded by a plurality of secondary modules to form a hexagonal cluster.

11. A system for generating artificial water waves of various configurations comprising:
    a pool bed;
    a plurality of telescoping modules controlled to remain generally coplanar with the pool bed or to establish a predetermined profile of an artificial reef structure having a toe extending in the pool bed, the artificial reef structure defining a series of at least three distinct surface regions, each comprising a proximal slope, a plateau, and a distal slope given in respective sequence to a kinetic energy direction; and
    the artificial reef structure configured to generate the artificial water waves of various configurations including crest, face and peel having peel direction and rate of peel, wherein kinetic energy in each generated artificial water wave approaches the toe structure along a length of the proximal slope to the plateau of the artificial reef structure, the generated artificial water waves breaking along the plateau to create the peel passing beyond the distal slope;
    wherein the telescoping modules each comprise:
        a telescoping upper body member;
        a dome positioned on the telescoping upper body member;
        a stationary lower body; and
        a bellows positioned within the telescoping upper body member and the stationary lower body member;
    wherein a configuration of the artificial reef structure is modified by increasing or decreasing a volume of water contained within the bellows and configuring a selection of the modules by extension to stationary, progressive predetermined heights in the predetermined profile to establish a specific size, shape and orientation of the artificial reef structure, wherein each of the proximal slope, plateau, and distal slope are comprised of a matrix of a plurality of adjacent telescoping modules extended at the stationary, progressive predetermined heights to generate the artificial water waves when acted upon by the kinetic energy, and wherein the artificial water waves continue to generate the peel in passing beyond the plateau and along the distal slope of the artificial reef structure and finally decay; and
    wherein the plurality of telescoping modules are configurable to be positioned in a plurality of variable, overlapping subsets extended or retracted to define the at least three distinct surface regions.

12. The system of claim 11, wherein each telescoping module further comprises:
    a distal retainer coupled to the bellows and to the stationary lower body member; and
    a proximal retainer coupled to the bellows and to the telescoping upper body member.

13. The system of claim 12, wherein each telescoping module further comprises a plurality of weep holes formed in the distal retainer device for removing debris from the telescoping module.

14. The system of claim 12, wherein each telescoping module further comprises an opening formed in the distal retainer for securing the inlet conduit to the distal retainer.

15. The system of claim 12, wherein each telescoping module further comprises an air bleeder valve coupled to the proximal retainer.

16. The system of claim 11, wherein each telescoping module further comprises an anchor base coupled to a primary stationary lower body member to secure the telescoping module to a chamber floor.

17. The system of claim 16, wherein at least one of the plurality of modules is configured as a primary module surrounded by a plurality of tangentially adjoining secondary modules coupled thereto.

18. A system configured for artificial water wave generation, the system comprising:
    a pool having pool walls and a pool bed to contain water in the pool;
    a chamber positioned below said pool bed;
    a plurality of adjacent telescoping modules positioned within said chamber, each of said telescoping modules having an upper end and a stationary lower body member;
    wherein each telescoping module is independently extendable and retractable, the plurality of telescoping modules controlled to remain generally coplanar with the pool bed or to establish a predetermined profile of an artificial reef structure, the artificial reef structure defining a series of at least three distinct surface regions, each comprising a proximal slope, a plateau, and a distal slope given in respective sequence to a kinetic energy direction;
    wherein some or all of the telescoping modules are positioned by extension in a stationary extended position in the predetermined profile, so as to form the artificial reef structure with each distinct surface region comprising a proximal slope, a plateau, and a distal slope, each distinct surface region further comprised of a matrix of a plurality of adjacent telescoping modules extended at stationary, progressive predetermined heights to establish a specific size, shape and orientation of said artificial reef;
    wherein said artificial reef is configured in the predetermined profile to generate an artificial breaking water wave having crest and peel when acted upon by kinetic energy introduced in an artificial wave generation process; and wherein the plurality of telescoping modules are configurable to be positioned in a plurality of variable, overlapping subsets extended or retracted to define the at least three distinct surface regions.

19. The system of claim 18, wherein the plurality of telescoping modules comprises at least one cluster of interconnected, adjoining telescoping modules.

20. The system of claim 19, wherein the adjoining telescoping modules are adjoined at circumferentially adjoining positions to form a hexagonal cluster.

21. A device capable of producing waves suitable for surfing, comprising:

a pool having pool walls and a pool bed to contain water within said pool;

a chamber within said pool having chamber walls and a chamber floor, said chamber located below said pool bed with said walls extending up to said pool bed;

a plurality of telescoping modules in said chamber controlled to remain generally coplanar with the pool bed or to establish a predetermined profile of an artificial reef structure, the artificial reef structure defining a series of at least three distinct surface regions, each comprising a proximal slope, a plateau, and a distal slope given in respective sequence to a kinetic energy direction;

said artificial reef structure positioned within said chamber, said artificial reef structure having said predetermined stationary profile including said series of at least three distinct surface regions, each with a proximal slope, plateau and distal slope that can be established remotely;

said predetermined stationary profile being configured to form breaking waves having crest and peel suitable for surfing when sufficient artificially generated wave energy flows over said artificial reef, wherein each of the proximal slope, plateau, and distal slope are comprised of a matrix of a plurality of adjacent telescoping modules extended at stationary, progressive predetermined heights to establish a specific shape, size and orientation of said artificial reef; and wherein the plurality of telescoping modules are configurable to be positioned in a plurality of variable, overlapping subsets extended or retracted to define the at least three distinct surface regions.

22. The system of claim 21, wherein said artificial reef comprises a plurality of adjacent module clusters arranged in a desired predetermined pattern, wherein each of said clusters is formed from a plurality of coupled telescoping modules, each of which can be separately adjusted in height to enable said artificial reef to achieve said predetermined profile.

23. The device of claim 22, wherein each of said module clusters comprises a primary telescoping module attached to said chamber floor and a plurality of secondary telescoping modules coupled to and supported by said primary module.

24. The device of claim 23, wherein said module clusters contain voids between the telescoping modules, thereby permitting the flow of water between said pool and said chamber.

25. The device of claim 22, wherein each of said telescoping modules has a proximal end that collapses on impact by a swimmer or surfer but then returns to its normal shape as a result of its elasticity.

26. The device of claim 22, wherein waves of a desired configuration, size, orientation, peel direction, and rate of peel can be generated by altering the predetermined profile of the artificial reef.

* * * * *